United States Patent
Dyer et al.

(10) Patent No.: US 6,785,308 B2
(45) Date of Patent: Aug. 31, 2004

(54) SPECTRAL CONDITIONING SYSTEM AND METHOD

(75) Inventors: Peter J. Dyer, Nepean (CA); Tom M. Luk, Ottawa (CA); Jean-Philippe Martel, Québec (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/109,120

(22) Filed: Mar. 28, 2002

(65) Prior Publication Data

US 2003/0185258 A1 Oct. 2, 2003

(51) Int. Cl.[7] .............................................. H01S 3/13
(52) U.S. Cl. .................................... 372/29.02; 372/32
(58) Field of Search ...................... 372/32, 34, 29.01, 372/18, 20, 29.016, 29.02, 36, 29.011, 31, 29.023; 359/124, 187; 385/37

(56) References Cited

U.S. PATENT DOCUMENTS

| | | | | |
|---|---|---|---|---|
| 5,781,572 A | * | 7/1998 | Tahara et al. ................. | 372/34 |
| 6,014,485 A | * | 1/2000 | Pan ............................. | 385/37 |
| 6,198,757 B1 | * | 3/2001 | Broutin et al. ................ | 372/32 |
| 6,295,147 B1 | * | 9/2001 | Yamane et al. ............. | 359/124 |
| 6,389,046 B1 | | 5/2002 | Stayt, Jr. et al. ......... | 372/29.02 |
| 6,483,625 B2 | * | 11/2002 | Shimura et al. ............. | 359/187 |
| 6,496,288 B2 | * | 12/2002 | Yamane et al. ............. | 359/124 |
| 6,516,010 B1 | * | 2/2003 | Broutin et al. ........... | 372/29.01 |
| 6,519,068 B1 | | 2/2003 | Broutin et al. ............. | 398/196 |
| 6,529,534 B1 | * | 3/2003 | Yasuda ........................ | 372/32 |
| 6,545,788 B1 | | 4/2003 | Ackerman et al. .......... | 398/195 |

\* cited by examiner

*Primary Examiner*—Don Wong
*Assistant Examiner*—Tuan N. Nguyen
(74) *Attorney, Agent, or Firm*—Christopher & Weisberg, P.A.

(57) ABSTRACT

A system and method for spectral conditioning an optical signal. An optical filter has an input for receiving an emitted optical signal and an output providing a filtered optical signal. The filter has a corresponding filter profile which includes a high wavelength skirt at an upper wavelength region of the filter profile. A laser is optically coupled to the optical filter input and emits the emitted optical signal. The laser is controllable to emit the optical signal at a wavelength proximate to the optical filter high wavelength skirt.

17 Claims, 5 Drawing Sheets

SPECTRAL CONDITIONING SYSTEM AND METHOD

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to fiber optic communications, and in particular to an system and method for spectrally conditioning the output of a fiber optic directly modulated laser transmitter to reduce the effects of dispersion and increase the span length between network elements.

BACKGROUND OF THE INVENTION

The proliferation of computing and networkable devices has created a need for increased bandwidth between locations, whether those locations are local, regional, national, or international. A technology extremely well suited to supporting high data rates over long distances is fiber optic communications. Typically, a fiber optic communication link includes a fiber optic transmitting device such as a laser, a fiber optic cable span, and a light receiving element. Fiber optic transmitters and receivers are typically quite extensive. As such, there is a desire to be able to increase the span length, i.e. increase the distance between network end points. However, the adverse effects of noise, attenuation and dispersion limit the distance between network elements. This impact is particularly seen as transmission rates increase, because as transmission rates increase, the sensitivity of the system to noise and dispersion also increases, effectively further limiting the span length as data rates increase. It is therefore desirable to have a method and system which increases dispersion-limited distance and permits the use of less expensive lasers in long distances.

Figure 1:
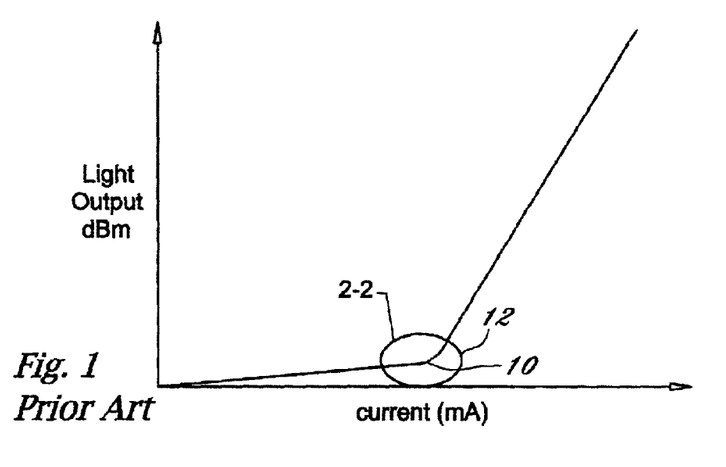
FIG. 1 is a prior art graph generally showing light output as a function of current input into a laser.

FIG. 1 is a graph generally showing light output as a function of current input into a laser. As shown in FIG. 1, there exists a knee 10 at which point the slope increases, i.e. light output increases at a greater rate for a given amount of current input into the laser than at points below the knee 10. It is therefore desired to operate a laser at a point just above knee 10 such that for a small amount of current, light output increases in an amount sufficient for a receiver to be able to detect a light existence, i.e. "1 bit" condition from a light off, i.e. "0 bit" condition. In operation, the light signal level for a "0 bit" is just above the knee and the light signal level for a "1 bit" is at the rated power output of the laser. The ratio of the "on" to "off" light for a 1 and 0 is referred to as an extinction ratio. It is desired to have a large extinction ratio number.

For directly modulated ("direct mod") lasers, operating the last above knee 10 reduces the optical noise and signal distortion. However, the trade-off is extinction ratio which shows up as a sensitivity penalty at the receiver. As such, there is a trade-off between the distortions and noise caused by the high extinction ratio at or below knee 10 and a low extinction ratio receiver penalty. Further, operating a direct mod laser below the knee 10 results in unwanted noise, referred to as chirp.

Figure 2:
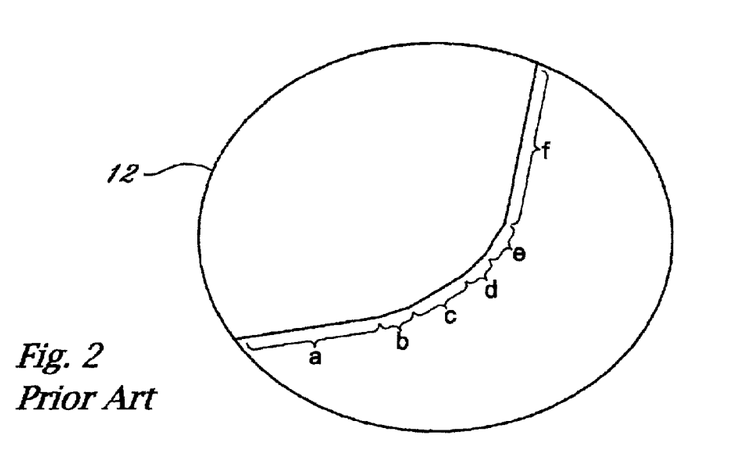
FIG. 2 is an enlarged view of section 2—2 in FIG. 1.
Figure 3:
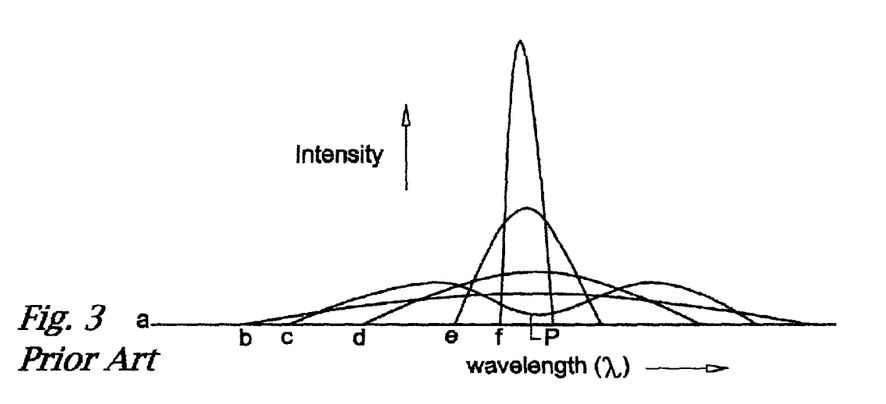
FIG. 3 is a prior art chart showing optical spectrum emitted for each bias environment depicted in FIG. 2.

Section 2—2 in FIG. 1 corresponds to knee region 12 and is shown in exploded view in FIG. 2. As shown in FIG. 2, knee region 12 is sub-divided into six sub-regions labeled a, b, c, d, e, and f, respectively. As is shown in FIG. 2, the slope of each successive sub-region increases. The relationship between the increasing slope and sub-regions a–f is explained with reference to FIG. 3. FIG. 3 is a chart showing optical spectrum emitted for each bias environment depicted in FIG. 2. As shown in FIG. 3, the laser, when operating in sub segment f, has a high intensity about the laser wavelength p. This high intensity allows the receiver to clearly discern that a "1" has been transmitted. As sub-regions along the knee are traversed, the intensity decreases, and the spectrum of light emitted by the laser increases. The result is a dispersion in the energy transmitted by the transmitting laser as detected by the receiver, and further results in unwanted noise, i.e. spectral content far removed from point p. The resulting impact is that this unwanted noise, i.e. chirp, adversely impacts the transmission capabilities of the system.

Figure 4:
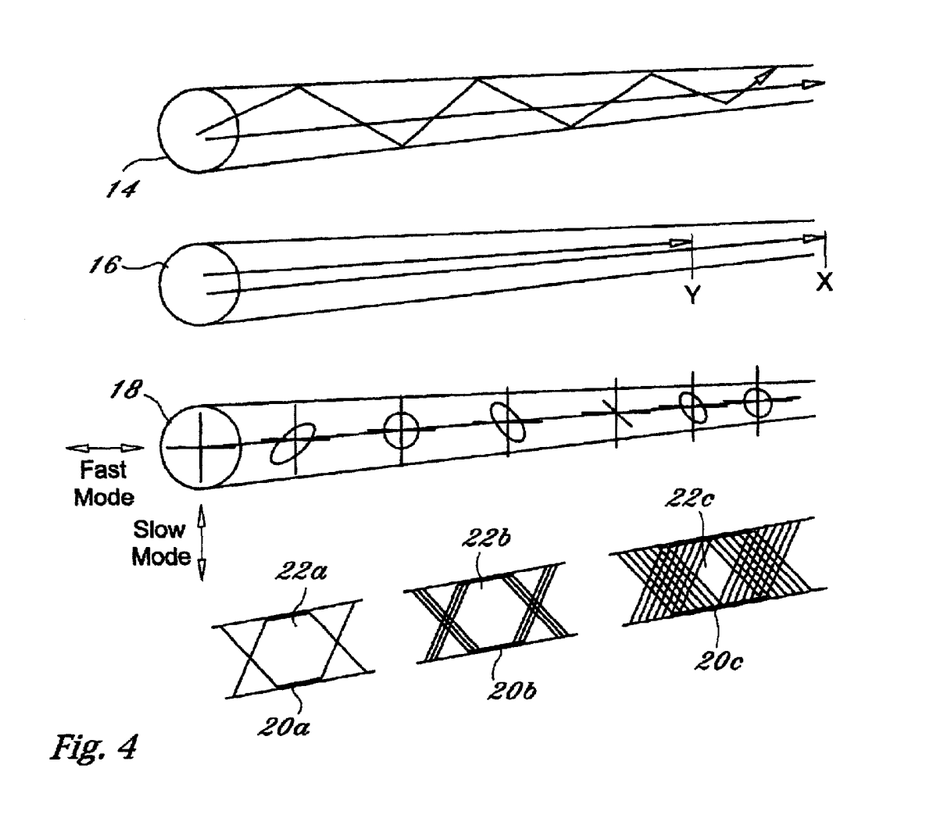
FIG. 4 is a prior art diagram illustrating types of dispersion.

Another factor which limits span distance and which is exacerbated by the existence of chirp is fiber dispersion. The wider the spectral output of the laser, the more differentiation in the dispersion of the fiber at the receiver. In other words, the wider the spectrum at the transmitting end, the more penalty is paid at the receiving end. As shown in FIG. 4, there are three main types of dispersion known to those of skill in the art. Multi-path (multi-modal) dispersion is illustrated in fiber 14. Chromatic dispersion is illustrated in fiber 16 and polarization mode dispersion is shown in fiber 18. Multi-path dispersion and polarization mode dispersion are not directly relevant to the subject invention and their discussion is therefore omitted.

Chromatic dispersion, shown in fiber 16, results from a characteristic in which different wavelengths of light travel at different velocities in a fiber optic cable. As a result, a wider spectral content results in a wider differentiation in arrival times of the light pulses, thereby causing intersymbol interference. For example, referring to fiber 16, a pulse transmitted at a given point which has a non-narrow spectral content results in a portion of the spectral content arriving at point x in a given time t, while other spectral portions of the same transmission only travel to point y in time t.

Eye diagrams 20a, 20b, and 20c show the adverse effects of the various types of distortion along a fiber optic cable. These effects are shown by the decrease in eye 22a, 22b, and 22c sizes along the distance of the fiber. The wider the eye, the easier it is for a receiver to detect the absence or presence of a bit. However, the longer the fiber, the more dispersion and the narrower the eye. Further, the shorter the bit period, the faster the effect impacts the receiver. As such, reducing the effects of dispersion along a fiber results in a wider eye, making reception easier. One way to accomplish this is by tightly controlling the transmission to, for example, reduce the effects of dispersion more effectively limiting the light spectrum transmitted by the laser. This can be accomplished by controlling chirp.

Chirp controlling technologies are expensive and are presently addressed by electrical regeneration, dispersion-compensating modules, or by generating a clean pulse shape. Regeneration is inefficient, because it requires the addition of network components due to limiting span length. Dispersion-compensating modules waste optical power and often require the addition of optical amplifiers. A clean pulse shape can be generated, thereby controlling chip by using externally-modulated lasers. However, externally-modulated lasers are larger in size than their directly-modulated counterparts and are significantly more expensive. It is desirable to have an arrangement which controls chirp, thereby reducing the effects of fiber dispersion in a manner which allows the use of an inexpensive directly-modulated laser without the need for additional external components such as dispersion-compensating modules, light-regenerating devices, and the like.

Standards such as those issued by the International Telecommunications Union ("ITU") specify a grid which includes standard light wavelengths for different transmission bit rates. The grid sets forth center optical frequencies for a band pass filter mask inside of which the transmission frequencies must reside. This band pass filter mask becomes particularly important due to frequency drift experienced by lasers as they age as well as a change in the characteristics in filter/wavelength division multiplexing ("WDM") coupling devices used to facilitate fiber optic communications.

Because the wavelength of light emitted by a laser is a function of the temperature of the laser, prior art devices have attempted to control the emitted light wavelength by monitoring the temperature of the laser using a device such as thermistor and heating or cooling the laser, as necessary, to attempt to maintain a fixed frequency. In this manner, manufacturers have attempted to provide fiber optic transmission systems which remain within the ITU grid during the operating life of the laser. These methods have finite precision and do not take into account the aging characteristics of the filter. Accordingly, it is desirable to have a method and system which provides for transmission of a specific wavelength in order to comply with known standards in a manner which is accurate despite the changes in performance characteristics of the filter.

SUMMARY OF THE INVENTION

The present invention advantageously provides a method and system which reduces the spectral output at a transmitter so that only the required spectrum is transmitted into the fiber optic cable. In order to reduce the spectral output, the present invention reduces chirp and locks the wavelength output of the emitted transmission laser light with respect to the filter edge. The effect is to minimize the dispersion penalty and allow an increase in network span. In addition, the present invention advantageously allows the use of inexpensive direct-mod lasers. Further, laser temperature control is not based on thermally-sensing laser temperature, but is instead based on the wavelength of the emitted transmission laser light.

According to an aspect of the present invention, an optical spectral conditioning system has an optical filter and a laser. The optical filter has an input for receiving a first optical signal, an output which provides a filtered optical signal and a filter profile. The filter profile includes a high wavelength skirt at an upper wavelength region of the filter profile. The laser is optically coupled to the optical filter input and emits the first optical signal. The laser is controllable to emit the first optical signal at a wavelength proximate to the optical filter high wavelength skirt.

According to another aspect, the present invention provides a method for spectrally conditioning an optical signal emitted by a laser and filtered by an optical filter optically coupled to the laser and having a characteristic filter profile including a high wavelength skirt at an upper wavelength region of the filter profile. The method includes controlling the laser to emit an optical signal at a wavelength proximate to the optical filter high wavelength skirt.

According to still another aspect, the present invention provides an optical spectral conditioning system, in which an optical filter has an input for receiving an emitted optical signal, an output providing a filtered optical signal and a filter profile. The filter profile includes a high wavelength skirt at an upper wavelength region of the filter profile. A directly modulated laser is optically coupled to the optical filter input and emits the emitted optical signal. The directly modulated laser is operable to emit the emitted optical signal at a wavelength proximate to the optical filter high wavelength skirt.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 5:
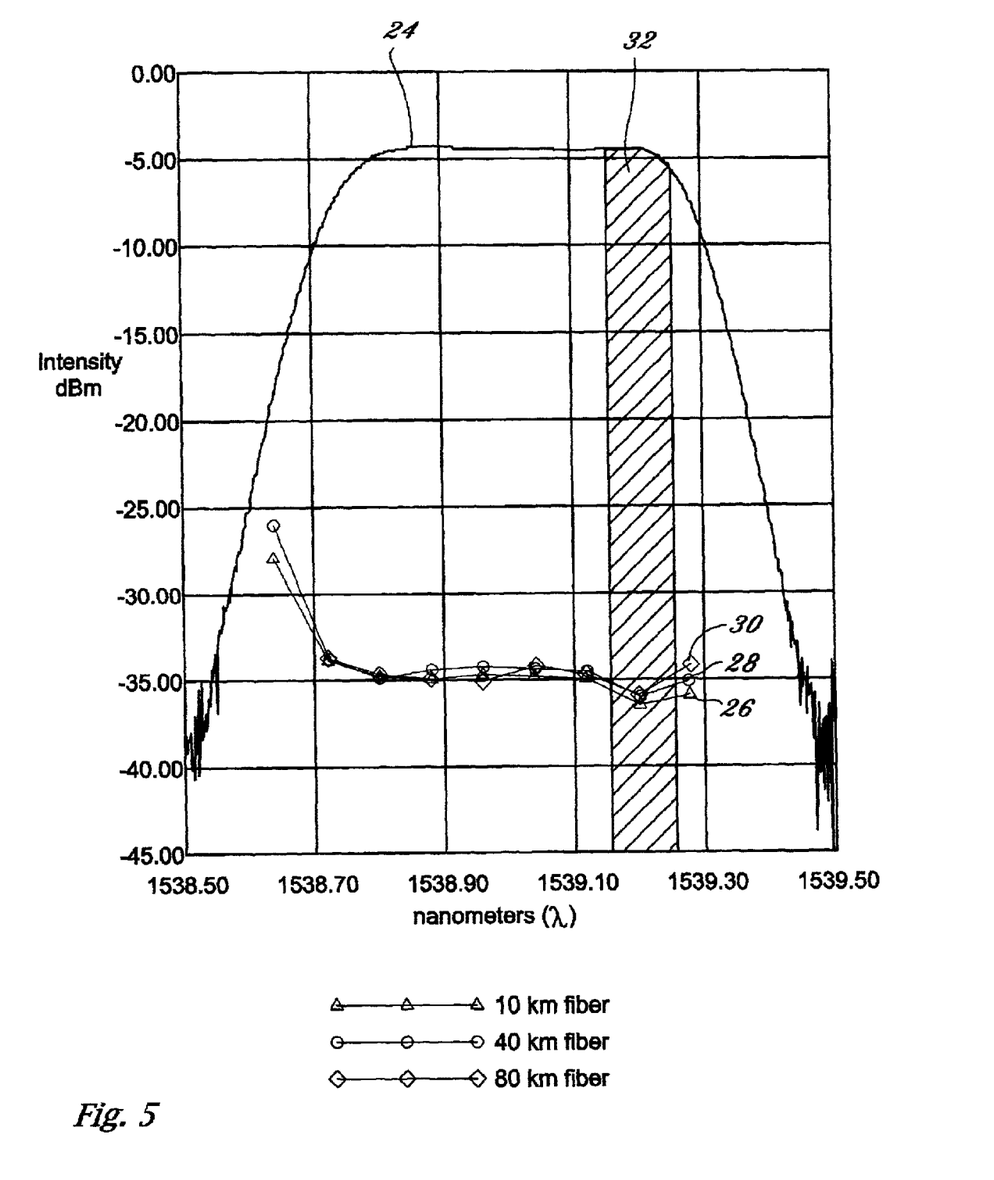
FIG. 5 is an exemplary filter profile graph.

To aid in the understanding of the present invention, the theory of operation is discussed first, followed by a description of an exemplary hardware embodiment which performs the inventive functions. FIG. 5 is a filter profile graph. The filter profile graph includes filter profile 24 and a plurality of superimposed intensity to wavelength traces 26, 28, and 30 for a simulated 10 kilometer fiber optic cable, 40 kilometer fiber optic cable, and 80 kilometer fiber optic cable, respectively. As shown in FIG. 5, filter profile 24 represents a band pass filter whose center wavelength is approximately 1538.98 nanometers. Filter profile 24 may correspond to an ITU grid filter profile.

Figure 6:
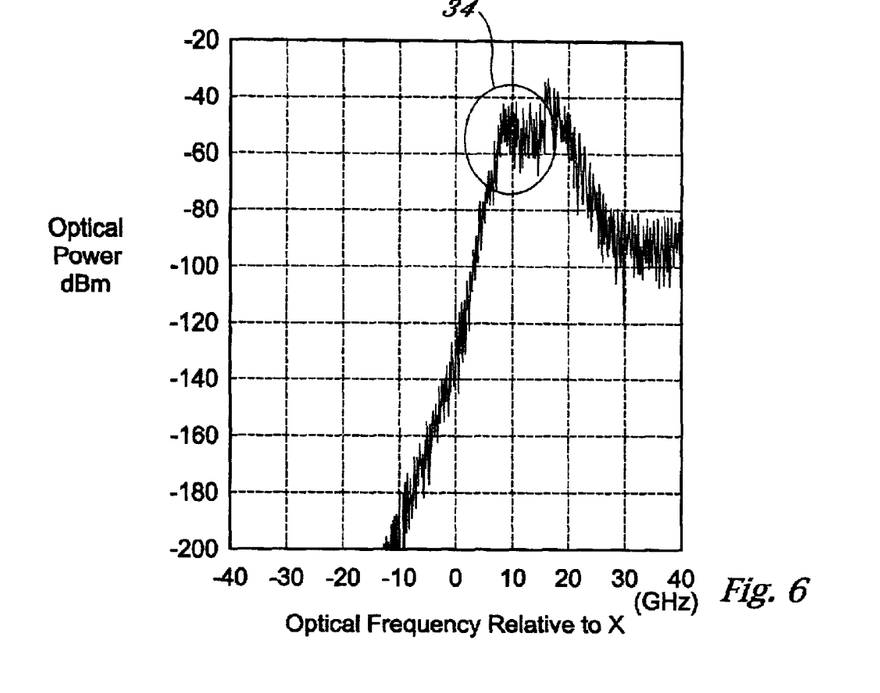
FIG. 6 is a graph of simulated optical power versus optical frequency without implementing the present invention.
Figure 7:
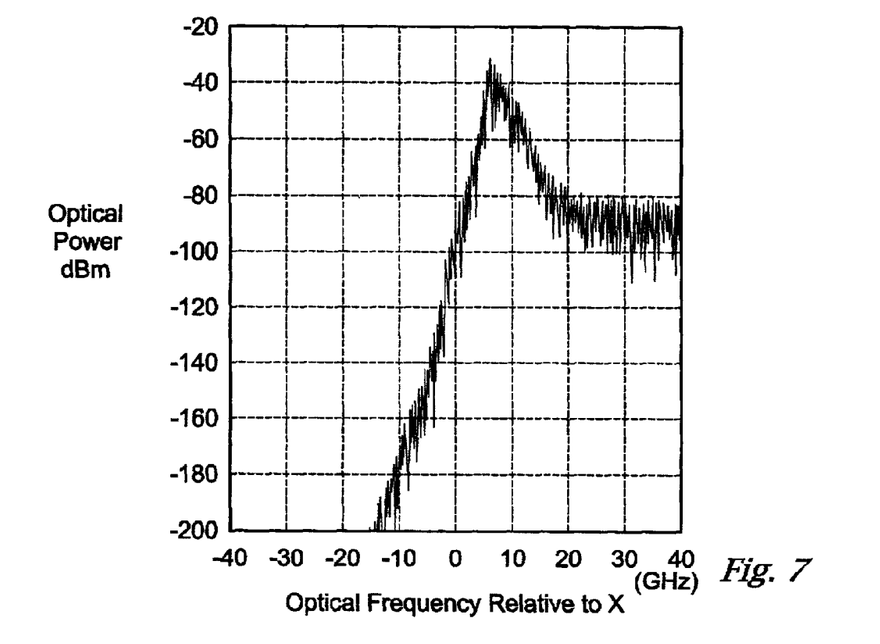
FIG. 7 is a graph of simulated optical power versus optical frequency in which the wavelength is locked to the high wavelength side of the filter skirt.

Graph lines 26, 28, and 30 represent measures of a receiver's performance, i.e. the ability to accurately recover a received signal. In the case of the specific graph lines shown in FIG. 5, a bit error rate of $10^{-10}$ is assumed. As such, the smaller the intensity in the "y" axis, the better the ability of the receiver to recover the received signal. As can be seen in FIG. 5, for each simulated fiber length, the optimal receiver performance occurs toward the right skirt of filter profile 24 (the larger wavelengths). In the case of the example shown in FIG. 5, optimal receiver performance is exhibited within hatched region 32. In other words, the optimum part of the filter is not at the center frequency or the lower frequency, but rather the optimum part of the filter is toward the right skirt. As such, locking the optical signal to the filter so that the transmit environment is working in hatched region 32 advantageously increases the dispersion limit of the network and allows for the recovery of the dispersion penalty paid when additional span length is implemented. FIGS. 6 and 7 are graphs illustrating the advantageous results provided by the present invention in reducing chirp when the optical wavelength is locked to the high wavelength side of the filter profile. FIGS. 6 and 7 each show optical power versus optical frequency relative to a particular frequency "x" which for example, can be a desired center laser frequency such as 194.77 terahertz. However, any center optical frequency can serve to illustrate the performance of the subject invention.

FIG. 6 shows simulated optical power versus optical frequency without implementing the present invention, i.e. without locking the wavelength to the high wavelength skirt of the profile. As is shown in FIG. 6, graph region 34 shows a significant amount of chirp in the 8 to 15 gigahertz region. Conversely, FIG. 7 shows a simulation of the same exemplary system in which the wavelength is locked to the high wavelength side of the filter skirt. As is seen in FIG. 7, no chirp is exhibited. The performance increase shown in FIG. 7 allows a larger fiber optic span length because the reduction of chirp minimizes adverse effects of dispersion.

Figure 8:
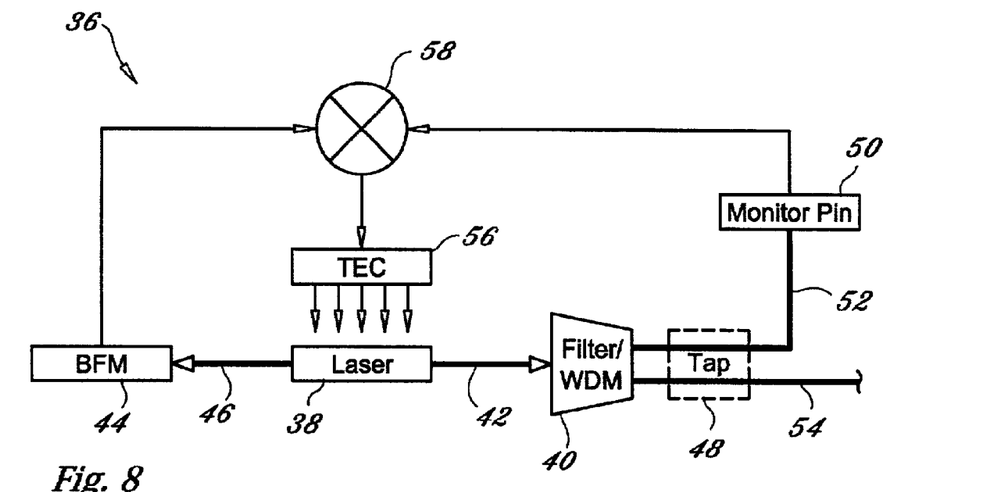
FIG. 8 is a diagram of an exemplary embodiment of a system constructed in accordance with the principles of the present invention.

An exemplary embodiment of a system constructed in accordance with the principles of the present invention is shown in FIG. 8 and designated generally as 36. System 36 includes laser 38 coupled to optical filter/wavelength division multiplexor ("WDM") 40 via optical link 42. Laser 38 is also optically coupled to back facet monitor ("BFM") 44 via optical link 46. Tap 48 diverts a small amount of optical power from the output of filter 40 and is optically coupled to monitor pin 50 via optical tap link 52. Fiber optic cable 54 provides an optical link to other devices, such as a transmitter at the remote end of the link (not shown). Thermolelectric cooler ("TEC") 56 is thermally coupled to laser 38. Because the wavelength of light emitted by a laser can be controlled and adjusted by varying the temperature of the laser, TEC 56 can be used to control and adjust the temperature thereby controlling and adjusting the resultant light wavelength emitted by laser 38. TEC 56 can be any suitable thermal electric cooler such as a Peltier device.

The thin lines in FIG. 8 represent electrical signal lines which electrically couple BFM 46, monitor pin 50, and TEC 56 to comparator 58. As is explained below in detail, by comparing the wavelength emitted by laser 38 using BFM 44 with the actual filtered wavelength observed by monitor pin 50, TEC 56 can be controlled to cause laser 38 to operate in the high wavelength side of the filter skirt. In other words, by dithering TEC 56, the wavelength can be locked to the high wavelength side of the filter wall. In the case of the subject invention, dither is a small electric current applied to TEC 54 to adjust the wavelength of laser 38. In this manner, electrical current can be translated into a corresponding wavelength.

Laser 38 is preferably a directly-modulated laser. Use of a directly-modulated laser advantageously reduces component and system costs. Filter 40 can be a thermally-sensitive or athermal device. Although filter 40 is shown as having only a single input from optical link 42, it is understood that filter 40 supports other optical link inputs which are wavelength division multiplexed and output to fiber optic cable 54. Of note, because the present invention locks the optical wavelength from laser 38 to the filter wall, thermally-sensitive devices can be used. Reference to thermally-sensitive devices with respect to filter 40 refers to temperature dependency in which the filtering characteristics of the device vary as the temperature changes. Also, because most DWDM systems already include a filter such as filter 40, the present invention advantageously allows the use of these existing filters.

Tap 48 is any optical tap suitable for deferring a small portion of the optical power to an output tap. BFM 44 measures the amount of light coming out of the back facet of laser 38. As is understood by those of skill in the art, measuring the amount of light emitted by the back facet of laser 38 allows a calculation which yields the amount of light coming out of the front facet of lasers 38, i.e. the amount of light input into optical link 42. BFM 44 includes an output which electrically corresponds to the measured power. It is this output which is input into comparator 58. BFM 44 is typically co-packaged in the laser package.

As with BFM 44, monitor pin 50 is used to detect a quantity of light and represent that detected quantity electrically. The electrical output of monitor pin 48 is provided as an input to comparator 58.

Comparator 58 is any electrical device capable of receiving an electrical signal from monitor pin 50 and BFM 44, comparing the two signals and creating an output signal provided to dither TEC 56. As such, comparator 58 compares the output of BFM 44 to determine what signal should be output by laser 38 with the output from monitor pin 50 and outputs the compared result to TEC 56 to adjust the temperature of laser 38 such that the output of laser 38 provides a wavelength at the filter wall. An advantageous result is that if the filter characteristics move, the laser moves with it. Because comparator 58 is comparing a signal based on the output of filter 40, any drift or degradation of filter 40 based on temperature or aging is taken into account when deriving the output signal to control TEC 56. In other words, any drift in the filter skirt is taken into account by comparator 58. The iterative comparative feedback process therefore advantageously establishes, detects, and maintains operation at the filter wall. It is also contemplated that the present invention can be implemented without BFM 44 by instead comparing the signal from tap 48 with the input to TEC 56.

Figure 9A:
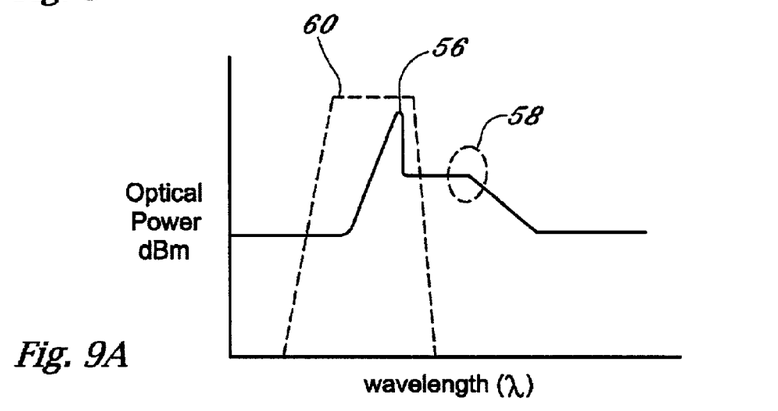
FIG. 9A is a graph of optical power and wavelength emitted by a laser constructed in accordance with the principles of the present invention.

Exemplary results of the system shown in FIG. 8 are described with reference to FIGS. 9A and 9B, both of which are graphs showing optical power versus wavelength. FIG. 9A represents a graph of optical power and wavelength emitted by laser 38. As can be seen, there is a significant positive chirp component at wavelengths greater than desired optimal emitted wavelength shown as peak 58. This chirp region is shown within area 60. Filter profile 62 is superimposed on the output graph for laser 38. Filter profile 62 corresponds to the profile of filter/WDM 40. Filter profile 62 is a band pass filter.

Figure 9B:
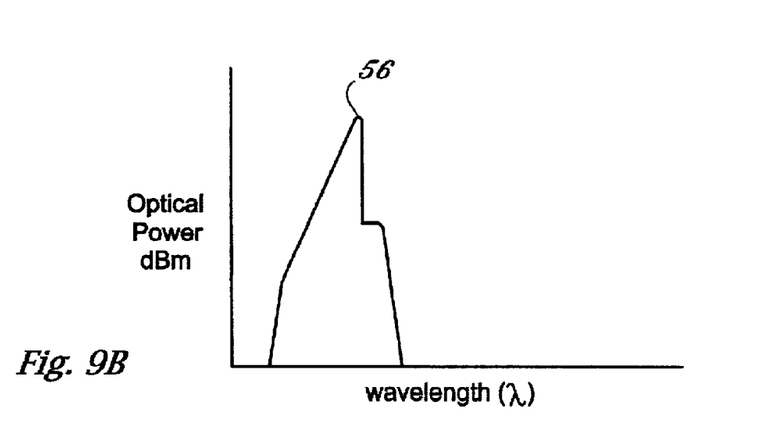
FIG. 9B is graph of a resultant output of a filter which is provided to a fiber optic link constructed in accordance with the principles of the present invention.

The resultant output of filter 40 which is provided to fiber optic link 54 is shown in FIG. 9B. As can be seen, by locking the wavelength output of laser 38 to the other wavelength portion of the filter profile for filter 40, area 60 is not within the band pass region of the filter and is thereby filtered out. The result is a refined optical power peak 58 with significantly minimized chirp present on the outgoing signal.

As is discussed above, a traditional implementation using a direct mod laser and filter which must comply with a standard such as the ITU standard implies that the designers must make sure that the laser wavelength does not wander and also that the filter characteristics do not wander or account for any wander such as filter wander based on aging.

In the case of the present invention, a thermal electric cooler is used to make sure that the laser does not wander with respect to the filter. In other words, even if the filter characteristics wander, the laser output is changed to correspond to the amount of filter wander such that the laser wavelength always operates at the higher wavelength side of the filter skirt. In other words, the present invention operates at the edge of the filter so the aging characteristics of the filter do not need to be controlled nor even specified in order to account for filter wander based on aging or temperature changes.

Put another way, in the prior art, the designer had to know the filter characteristics because they are a reference which dictated laser performance. As such, many designers used athermal filters because their characteristics were more predictable and allowed for system design which could be accurately predicted to stay within a particular range, i.e. comply with known standards. Although use of athermal filters is possible with the present invention, it is not necessary because laser output is tied to the changes in filter characteristics. The present invention, therefore, makes system design easier, because by locking the wavelength to the filter one need only control the filter specifications to make sure that the filter will operate within the desired specifications, and not the filter and laser. The result is that the present invention obviates the need to use wavelength lockers to lock laser output to a particular wavelength.

The present invention advantageously provides a method and system which allows the spectral output of a transmitting laser to be conditioned to reduce chirp and wander by locking the output of the direct mod laser to the higher wavelength region of its corresponding filter. Two advantages result. First, is that the present invention reduces chirp. Second, the present invention reduces system sensitivity to changes in individual component characteristics due to thermal changes and aging.

The present invention advantageously allows the use of relatively inexpensive direct mod lasers. The present invention is operable using thermally-sensitive filters and athermally-sensitive filters, although athermally-sensitive filters are preferred if all other specifications such as cost are equal. However, the present invention advantageously allows the use of thermally-sensitive filters as compared with expensive athermally-sensitive filters to decrease noise output by the transmitting system and thereby increase the span length possible between transmitting and receiving fiber optic elements.

Although an embodiment of the present invention is described with the use of directly modulated lasers, it is understood that the present invention can also be implemented using other modulation types such as externally modulated lasers.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An optical spectral conditioning system, comprising:
   a laser emitting an optical signal, the laser having a back facet emitting a first portion of the optical signal and a front face emitting a second portion of the optical signal;
   a first monitor optically coupled to the back facet of the laser, the first monitor generating a first electrical signal corresponding to the first portion of the optical signal;
   an optical bandpass filter receiving the second portion of the optical signal from the front face of the laser and providing an optically filtered bandpass output, the optical bandpass filter having filtering characteristics defined by a filter profile, the filter profile including a high wavelength skirt at an upper wavelength region of the filter profile;
   a second monitor optically coupled to the output of optical bandpass filter, the second monitor generating a second electrical signal corresponding to the light emitted by the output of the bandpass filter; and
   a comparator receiving the first electrical signal and the second electrical signal, the comparator generating a dithering signal based on the first electrical signal and the second electrical signal, the dithering signal causing the laser to emit the first optical signal at the wavelength proximate to the optical filter high wavelength skirt.

2. The optical spectral conditioning system according to claim 1, further comprising a thermoelectric cooler thermally coupled to the laser, the thermoelectric cooler receiving the dithering signal and generating a temperature to control the laser to emit the first optical signal at the wavelength proximate to the optical filter high wavelength skirt based on the dithering signal.

3. The optical spectral conditioning system according to claim 2, wherein the laser is a directly modulated laser.

4. The optical spectral conditioning system according to claim 2, wherein the thermoelectric cooler is a Peltier cooler.

5. The optical spectral conditioning system according to claim 1, wherein the second monitor is a monitor pin, the monitor pin generating the second electrical signal based on the wavelength of the bandpass filter output.

6. The optical spectral conditioning system according to claim 1, wherein the first monitor is a back facet monitor, the back facet monitor generating the first electrical signal based on the wavelength of the first portion of the optical signal.

7. The optical spectral conditioning system according to claim 1, wherein the optical filter is a thermally sensitive optical filter.

8. The method according to claim 1, wherein:
   the first electrical signal corresponds to the intensity of the first portion of the optical signal; and
   the second electrical signal corresponds to the intensity of the second portion of the optical signal.

9. The method according to claim 8, wherein the first portion of the optical signal is emitted by a back facet of the laser and the second portion of the optical signal is emitted by a front face of the laser.

10. A method for spectrally conditioning an optical signal emitted by a laser, the method comprising:
   using the laser to emit a first portion and a second portion of an optical signal;
   generating a first electrical signal corresponding to the first portion of the optical signal;
   producing an optically filtered bandpass output based on the second portion of the optical signal using a filter having filtering characteristics defined by a filter profile, the filter profile including a high wavelength skirt at an upper wavelength region of the filter profile;
   generating a second electrical signal corresponding to the optically filtered bandpass output;
   generating a dithering signal based on the first electrical signal and the second electrical signal; and
   operating the laser to emit the second portion of the optical signal at the wavelength proximate to the optical filter high wavelength skirt based on the dithering signal.

11. The method according to claim 10, wherein operating the laser to emit the second portion of the optical signal at the wavelength proximate to the optical filter high wavelength skirt an optical filter includes using the dithering signal to adjust the operating temperature of the laser.

12. The method according to claim 11, wherein the operating temperature of the laser is adjusted by a thermoelectric cooler.

13. A method for spectrally conditioning an optical signal emitted by a directly modulated laser, the method comprising:

using the directly modulated laser to emit a first portion and a second portion of an optical signal;

generating a first electrical signal corresponding to the first portion of the optical signal;

producing an optically filtered bandpass output based on the second portion of the optical signal using a filter having filtering characteristics defined by a filter profile, the filter profile including a high wavelength skirt at an upper wavelength region of the filter profile;

generating a second electrical signal corresponding to the optically filtered bandpass output;

generating a dithering signal based on the first electrical signal and the second electrical signal; and operating the directly modulated laser to emit the second portion of the optical signal at the wavelength proximate to the optical filter high wavelength skirt based on the dithering signal.

14. The method according to claim 13, wherein operating the directly modulated laser to emit the second portion of the optical signal at the wavelength proximate to the optical filter high wavelength skirt an optical filter includes using the dithering signal to adjust the operating temperature of the laser.

15. An optical spectral conditioning system, comprising:

a directly modulated laser emitting an optical signal, the directly modulated laser having a back facet emitting a first portion of the optical signal and a front face emitting a second portion of the optical signal;

a first monitor optically coupled to the back facet of the laser, the first monitor generating a first electrical signal corresponding to the first portion of the optical signal;

an optical bandpass filter receiving the second portion of the optical signal from the front face of the laser and providing an optically filtered bandpass output, the optical bandpass filter having filtering characteristics defined by a filter profile, the filter profile including a high wavelength skirt at an upper wavelength region of the filter profile;

a second monitor optically coupled to the output of optical bandpass filter, the second monitor generating a second electrical signal corresponding to the light emitted by the output of the bandpass filter; and a comparator receiving the first electrical signal and the second electrical signal, the comparator generating a dithering signal based on the first electrical signal and the second electrical signal, the dithering signal causing the directly modulated laser to emit the first optical signal at the wavelength proximate to the optical filter high wavelength skirt.

16. The optical spectral conditioning system according to claim 15, further comprising a thermoelectric cooler thermally coupled to the directly modulated laser, the thermoelectric cooler receiving the dithering signal and generating a temperature to control the laser to emit the first optical signal at the wavelength proximate to the optical filter high wavelength skirt based on the dithering signal.

17. The optical spectral conditioning system according to claim 16, wherein the dithering signal corresponds to a difference between a desired optical signal strength of the second portion of the optical signal and a signal strength of the output of the optical bandpass filter.

\* \* \* \* \*